US012811847B2

(12) United States Patent
Martin et al.

(10) Patent No.: US 12,811,847 B2
(45) Date of Patent: Nov. 24, 2026

(54) DYNAMIC FEEDBACK INFORMATION ABOUT A NETWORK ERROR

(71) Applicant: Shasta Cloud, Inc., Carmel, CA (US)

(72) Inventors: Steve A. Martin, Carmel, CA (US); Doron Givoni, San Jose, CA (US)

(73) Assignee: Shasta Cloud, Inc., Carmel, CA (US)

( * ) Notice: Subject to any disclaimer, the term of this patent is extended or adjusted under 35 U.S.C. 154(b) by 524 days.

(21) Appl. No.: 18/216,516

(22) Filed: Jun. 29, 2023

(65) Prior Publication Data

US 2025/0007775 A1 Jan. 2, 2025

(51) Int. Cl.

| | |
|---|---|
| ***H04W 24/04*** | (2009.01) |
| ***H04L 41/0659*** | (2022.01) |
| ***H04L 41/0686*** | (2022.01) |
| *H04W 84/12* | (2009.01) |

(52) U.S. Cl.

CPC ...... *H04L 41/0686* (2013.01); *H04L 41/0661* (2023.05); *H04W 24/04* (2013.01); *H04W 84/12* (2013.01)

(58) Field of Classification Search

CPC .. H04L 41/06-0695; H04W 24/00-10; H04W 40/24-248; H04W 84/12

See application file for complete search history.

(56) References Cited

U.S. PATENT DOCUMENTS

| | | | | |
|---|---|---|---|---|
| 10,049,509 | B1 * | 8/2018 | Liu | G07C 5/008 |
| 2012/0131416 | A1 * | 5/2012 | Dugan | G06F 11/32 714/760 |
| 2016/0360430 | A1 * | 12/2016 | Stevens | H04W 76/30 |
| 2018/0049063 | A1 * | 2/2018 | Xu | H04W 28/082 |
| 2019/0110211 | A1 | 4/2019 | Jain et al. | |
| 2019/0215236 | A1 | 7/2019 | Jain et al. | |
| 2019/0253960 | A1 * | 8/2019 | Hodroj | H04W 36/302 |
| 2020/0287782 | A1 * | 9/2020 | Singh | H04L 41/0631 |

OTHER PUBLICATIONS

PCT Patent Appl. Serial No. PCT/US24/33315, International Search Report and Written Opinion, Sep. 5, 2024.

* cited by examiner

*Primary Examiner* — Ronald Eisner
(74) *Attorney, Agent, or Firm* — Steven Stupp

(57) ABSTRACT

A communication network device that selectively provides dynamic feedback information is described. When an error associated with the communication network device occurs, the communication network device may provide a beacon with the feedback information associated with the error, where the feedback information includes an error message that indicates the error in human-readable form. Notably, the feedback information may be included in a secondary attribute associated with the communication network device. Notably, the feedback information may be included in Passpoint information associated with a wireless local area network (WLAN) provided by the communication network device. Alternatively or additionally, the feedback information may be included in an SSID associated with the communication network device. For example, when the error occurs, the communication network device may dynamically change the SSID of a wireless local area network (WLAN) provided by the communication network device to include the feedback information.

20 Claims, 5 Drawing Sheets

DYNAMIC FEEDBACK INFORMATION ABOUT A NETWORK ERROR

FIELD

The described embodiments relate to techniques for providing feedback information when an error (such as a connection problem) occurs in a network that includes a communication network device.

BACKGROUND

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard (which is sometimes referred to as 'Wi-Fi®,' from the Wi-Fi Alliance of Austin, Texas). For example, a wireless network may include an access point that communicates wirelessly with one or more associated electronic devices (which are sometimes referred to as 'clients' or 'stations').

During operation, an electronic device may discover a proximate access point. For example, the access point may broadcast beacons in a WLAN with information about the access point. When the electronic device receives a beacon, the electronic device may establish a connection with the access point (which is sometimes referred to as 'association'). Alternatively or additionally, the electronic device may provide a probe request to the access point, and in response the access point may provide a probe response with information about the access point. Then, using this information, the electronic device may associate with the access point.

However, problems sometimes occur when an electronic device attempts to associate with or establish a connection with an access point. This is often frustrating for a user of an electronic device that is trying to establish a connection, because it is difficult for the user to obtain information about the source of the problem and, thus, to troubleshoot the problem. For example, the user may need to first login to the access point (and, more generally, a 'communication network device,' which may also include a switch or a router), which may be difficult because of the aforementioned connection issue and the restricted or limited user interface on the access point. Alternatively or additionally, the user may need to contact technical support. This is also frustrating, because the user may not have the knowledge needed to explain the problem or even to identify the problematic access point, and it may be difficult for remotely located technical support to identify and solve the problem.

SUMMARY

A communication network device that selectively provides dynamic feedback information is described. This communication network device includes: an interface circuit, memory storing program instructions, and a processor that executes the program instructions. When an error associated with the communication network device occurs, the communication network device provides a beacon with the feedback information associated with the error, where the feedback information includes an error message that indicates the error in a human-readable format.

For example, the error may occur when an electronic device attempts to associate with the communication network device or when the communication network device attempts to communicate with a service in a network that includes the communication network device.

Note that the communication network device may include: an access point, a switch or a router.

Moreover, the feedback information may be included in or associated with a selective service set identifier (SSID) associated with the communication network device. For example, when the error occurs, the communication network device may dynamically change the SSID of a WLAN provided by the communication network device to include the feedback information.

Alternatively or additionally, the feedback information may be included in a secondary attribute associated with the communication network device. For example, the feedback information may be included in Passpoint® (from the Wi-Fi Alliance of Austin, Texas) information associated with the WLAN provided by the communication network device. Note that the Passpoint® information may identify the communication network device that is associated with the error.

Furthermore, the feedback information may include an image associated with the error, such as a barcode or a quick response (QR) code. Additionally, the feedback information may include information about a remedial action to perform to address the error, such as an individual to contact regarding the error.

Note that the feedback information may include information associated with the error, such as real-time information. For example, the information may include a communication performance metric of the network that is impacted by the error.

Moreover, the feedback information may be provided without requiring that a user login to the communication network device or the network.

In some embodiments, when the error occurs, the communication network device may change a property of the service associated with the network.

Another embodiment provides a neighboring communication network device to the communication network device (e.g., in proximity to or wireless range of the communication network device). Note that the neighboring communication network device or the electronic device may execute a mobile application. During operation, the neighboring communication network device may automatically sense a localized failure (by the communication network device, such as an access point) by: receiving a broadcast or SSID error code from the failed communication network device, establishing in a private communication channel with the failed communication network device (such as a Wi-Fi® connection with a private encrypted SSID, Bluetooth, etc.), collecting failure data (such as troubleshooting information) from the failed communication network device, and uploading error data from the failed communication network device, e.g., to a cloud-based controller or computer system, to assist the failed communication network device in using existing wired backhaul network(s). In some embodiments, the neighboring communication network device may create an associated service ticket for the failed communication network device.

Alternatively or additionally, when there is the localized failure of one communication network device or a general network failure (such as of the backhaul network), the electronic device running the mobile application may sense the problem by: receiving a broadcast or SSID error code from the failed communication network device (e.g., via Wi-Fi®), establishing, in a band of frequencies, a private communication channel (such as a Wi-Fi® connection with a private encrypted SSID, Bluetooth, etc.) to the failed communication network device, collect failure data (troubleshooting information) from the failed communication network device, and upload error data to the cloud-based controller or computer system using an out-of-band cellular connection (e.g., 4G/5G) to assist the failed communication network device (or communication network devices) use an out-of-band communication network (such as a cellular-telephone network). In some embodiments, the electronic device may create an associated service ticket for the failed communication network device.

Another embodiment provides a computer (such as a controller) that performs at least some of the aforementioned operations and/or or counterpart operations in one or more of the preceding embodiments.

Another embodiment provides the electronic device that performs at least some of the aforementioned operations and/or or counterpart operations in one or more of the preceding embodiments.

Another embodiment provides a computer-readable storage medium with program instructions for use with the communication network device, the computer or the electronic device. When executed by the communication network device, the neighboring communication network device, the computer or the electronic device, the program instructions cause the communication network device, the neighboring communication network device, the computer or the electronic device to perform at least some of the aforementioned operations and/or counterpart operations in one or more of the preceding embodiments.

Another embodiment provides a method, which may be performed by the communication network device, the neighboring communication network device, the computer or the electronic device. This method includes at least some of the aforementioned operations and/or counterpart operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
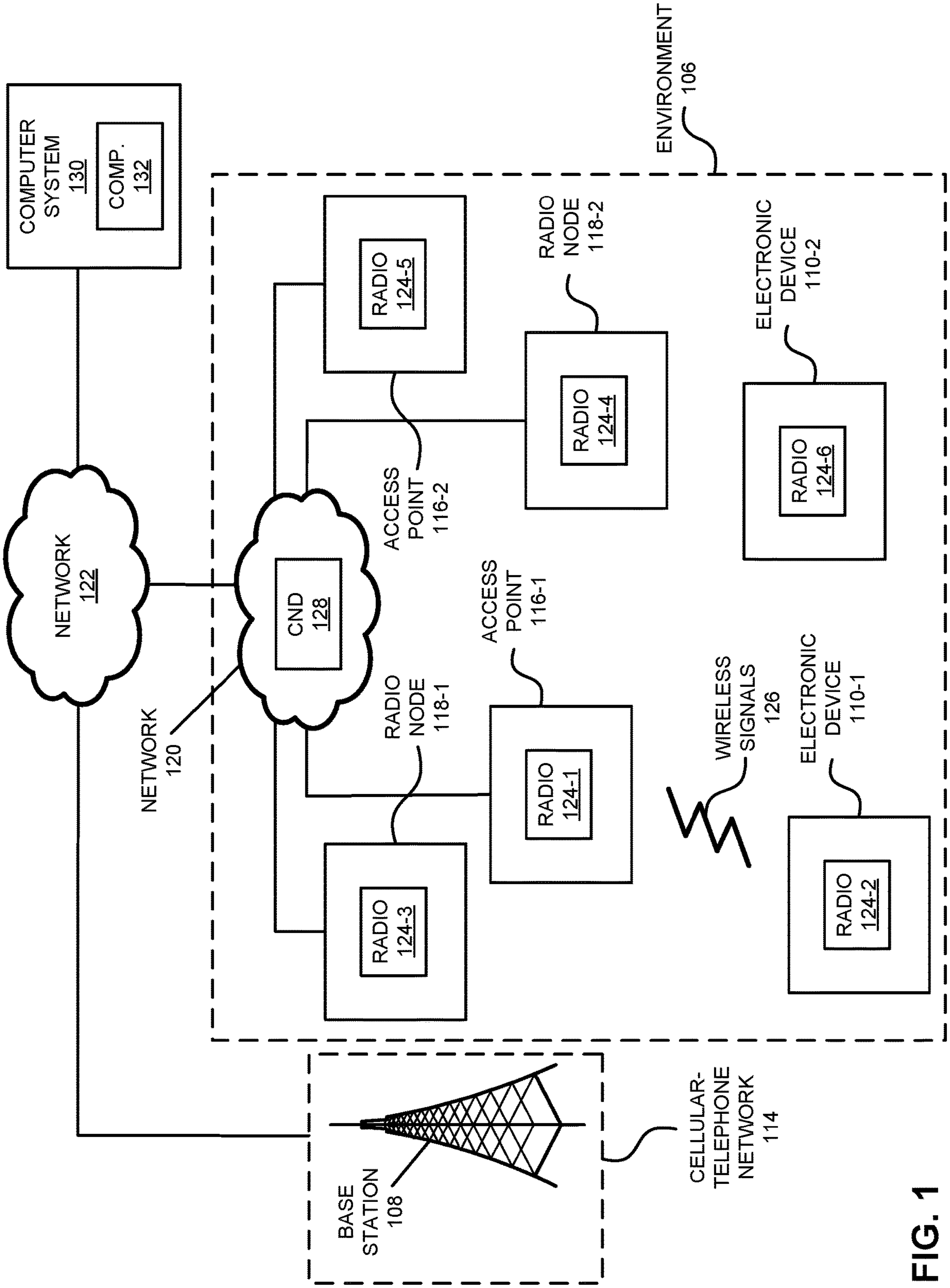
FIG. 1 is a block diagram illustrating an example of communication among electronic devices in accordance with an embodiment of the present disclosure.

A communication network device that selectively provides dynamic feedback information is described. When an error associated with the communication network device occurs, the communication network device may provide a beacon with the feedback information associated with the error, where the feedback information includes an error message that indicates the error in human-readable form. Notably, the feedback information may be included in a secondary attribute associated with the communication network device. Notably, the feedback information may be included in Passpoint® information (such as a Passpoint® attribute) associated with the communication network device. Alternatively or additionally, the feedback information may be included in an SSID associated with the communication network device. For example, when the error occurs, the communication network device may dynamically change the SSID of a WLAN provided by the communication network device to include the feedback information. Note that the communication network device may include: an access point, a switch or a router.

By selectively providing the dynamic feedback information, the communication techniques may allow a user (such as a user of the electronic device) who is not a domain or technical expert to access the feedback information without logging into the communication network device or the network. Instead, all that is needed is that the electronic device be in proximity (or wireless range) of the communication network device (physical access may not be needed). Moreover, the feedback information may allow the user to address the error, e.g., by taking appropriate remedial action and/or communicating more effectively with technical support. Consequently, the communication techniques may allow a wide range of users to understand and to address the error. Thus, the communication techniques may demystify and democratize the addressing of errors in the communication network device and/or the network, and may reduce the cost, time and complexity currently needed to address errors. Therefore, the communication techniques may improve the user experience when using the communication network device and, more generally, the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®'), Bluetooth or Bluetooth low energy or BLE (from the Bluetooth Special Interest Group of Kirkland, Washington), a cellular-telephone network or data network communication protocol (such as a third generation or 3G communication protocol, a fourth generation or 4G communication protocol, e.g., Long Term Evolution or LTE (from the 3$^{rd}$ Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch (and, more generally, a communication network device) in the wireless network may communicate with a local or remotely located computer or computer system using a wired communication protocol, such as a wired communication protocol that is compatible with an IEEE 802.3 standard (which is sometimes referred to as 'Ethernet'), e.g., an Ethernet II standard and/or another type of wired interface. However, a wide variety of communication protocols may be used in the system, including wired and/or wireless communication. In the discussion that follows, Wi-Fi® and Ethernet are used as illustrative examples.

We now describe some embodiments of the disclosed techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi®) in a wireless local area network (WLAN) and/or one or more radio nodes 118 (which may communicate using LTE or a 5G cellular-telephone data communication protocol), e.g., one or more radio nodes 118 in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication network device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or a computer system 130 (such as an optional controller, which may be a local or a cloud-based controller that manages and/or configures access points 116, radio nodes 118 and/or another communication network device or CND 128, e.g., a switch or a router) using a wired communication protocol (such as Ethernet) via network 120 and/or 122. Moreover, computer system 130 may include one or more computers 132. However, in some embodiments, access points 116 and/or radio nodes 118 may communicate with each other and/or the controller using wireless communication (such as Wi-Fi®, Bluetooth and/or another wireless communication protocols), e.g., one of access points 116 may be a mesh access point in a mesh network. Note that networks 120 and 122 may be the same or different networks. For example, networks 120 and/or 122 may an LAN, an intra-net or the Internet. In some embodiments, wireless communication between at least pairs of components in FIG. 1 involves the use of dedicated connections, such as via a peer-to-peer (P2P) communication technique.

Figure 6:
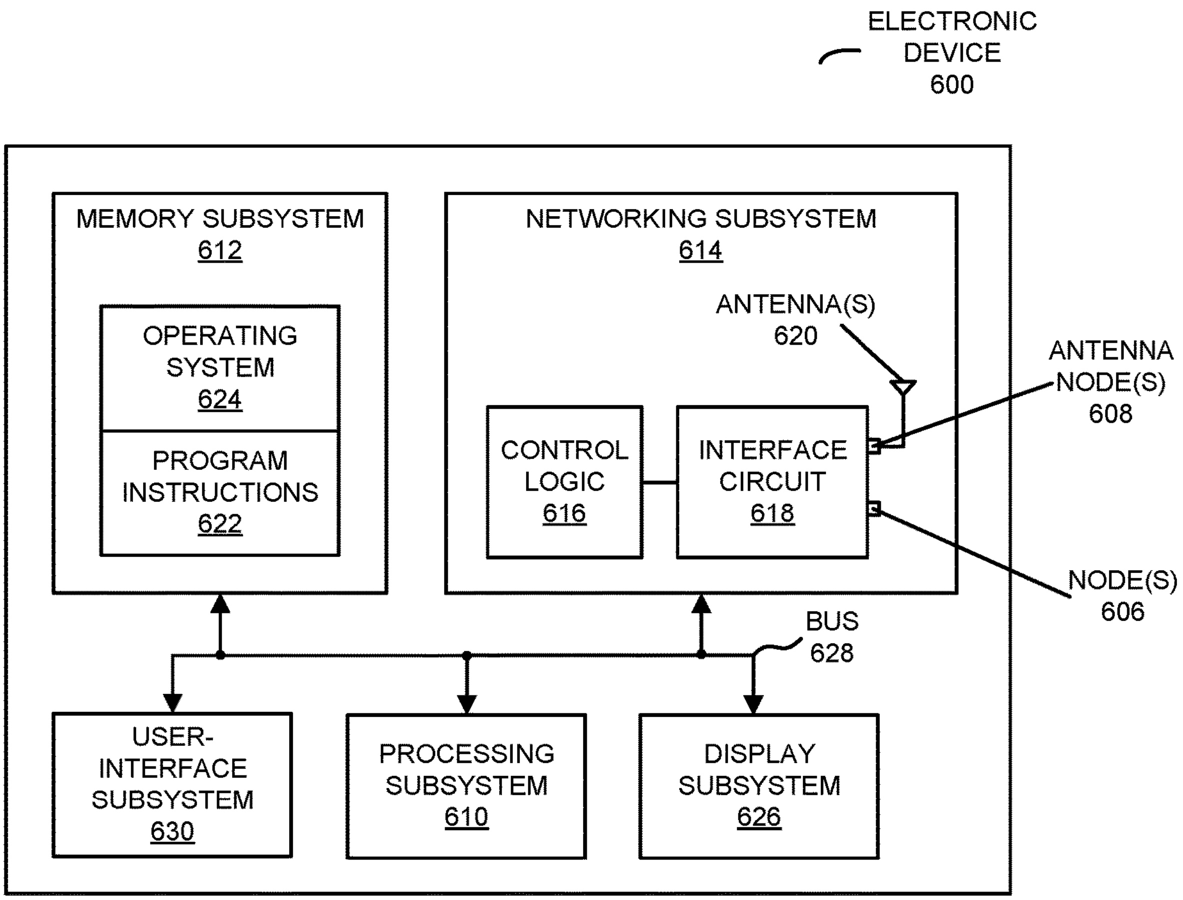
FIG. 6 is a block diagram illustrating an example of an electronic device in accordance with an embodiment of the present disclosure.

As described further below with reference to FIG. 6, electronic devices 110, access points 116, radio nodes 118, the other communication network device 128, and computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data or management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame: decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHZ, 2.4 GHz, 5 GHZ, 6 GHz, 7 GHz, 60 GHz, the Citizens Broadband Radio Spectrum or CBRS (e.g., a frequency band near 3.5 GHZ), and/or a band of frequencies used by LTE or another cellular-telephone data communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to address errors that occur in a network, such as a network that includes one or more communication network devices. In the discussion that follows, access point 116-1 is used as an illustration of a communication network device.

Note that a network error may make it difficult for a remotely located support service to access an access point that is experiencing an error. When only a non-technical person or user is physically located near the access point, they may need to attempt to read the human-readable error code on the access point in order to convey useful information to the remotely located support service. For example, the non-technical user may say: "I see this SSID that has a particular error code." However, it is often very difficult for the non-technical user to access and correctly provide such information.

Moreover, as discussed below with reference to FIGS. 2-5, these problems may be addressed using the communication techniques. Notably, when an error associated with access point 116-1 occurs, access point 116-1 may provide a beacon with the feedback information associated with the error, where the feedback information includes an error message that indicates the error in a human-readable format.

For example, the error may occur when electronic device 110-1 attempts to associate with access point 116-1 or when access point 116-1 attempts to communicate with a service in the network that includes access point 116-1 (such as a dynamic host control protocol or DHCP server or an authentication server).

Moreover, the feedback information may be included in or associated with an SSID associated with access point 116-1. For example, when the error occurs, access point 116-1 may dynamically change the SSID of a WLAN provided or hosted by access point 116-1 to include the feedback information. In some embodiments, the error indicator (or information that specifies the error) may be unique to access point 116-1, which may allow access point 116-1, which is broadcasting the fault (and/or to which electronic device 110-1 is trying to connect), to be readily identified in a multiple access-point environment.

Figure 5:
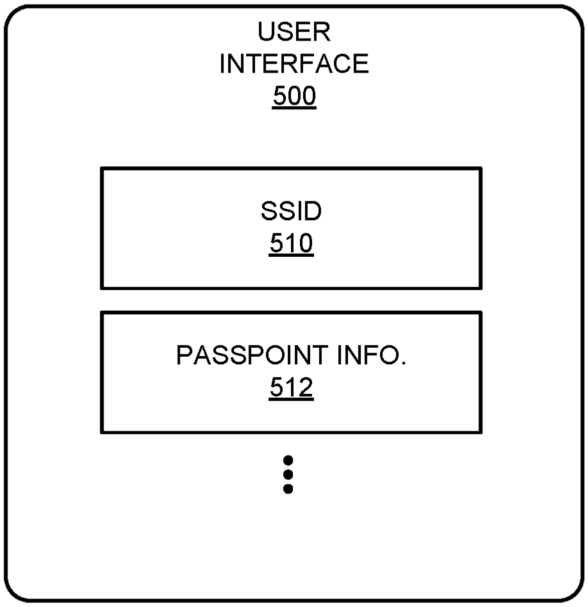
FIG. 5 is a drawing illustrating an example of a user interface in an electronic device in accordance with an embodiment of the present disclosure.

Alternatively or additionally, as shown in FIG. 5, the feedback information may be included in a secondary attribute associated with access point 116-1. For example, the feedback information may be included in Passpoint® information associated with the WLAN provided by access point 116-1. Note that the Passpoint® information may identify access point 116-1 that is associated with the error. This may facilitate more-rapid repair or addressing of the error.

Furthermore, the feedback information may include an image associated with the error, such as a one or two-dimensional barcode, e.g., a QR code. Additionally, the feedback information may include information about a remedial action to perform to address the error, such as an individual to contact regarding the error.

Note that the feedback information may include information associated with the error, such as real-time information. For example, the information may include a performance metric (which is sometimes referred to as a 'communication performance metric') of the network that is impacted by the error.

Moreover, the feedback information may be provided without requiring that a user login to access point 116-1 or the network.

In some embodiments, when the error occurs, access point 116-1 may change a property of the service associated with the network. For example, the service may include a DHCP service provided by a DHCP server or an authentication service provided by an authentication server. In these embodiments, the property may include which device(s) in the network perform the service, an amount or degree of security associated with the service, etc. Notably, in some embodiments, when access point 116-1 is unable to communicate with the service (e.g., via network 120 and/or 122), access point 116-1 may temporarily perform the service or an approximation of the service with reduced security. Thus, access point 116-1 may store information that allows access point 116-1 to provide an Internet Protocol (IP) address to electronic device 110-1 and/or to authenticate a user of electronic device 110-1. Alternatively, when access point 116-1 is unable to communicate with the authentication service, access point 116-1 may allow electronic device 110-1 to access a non-sensitive portion of and/or service(s) in the network that does not have a secure-access requirement.

In these ways, the disclosed communication techniques may provide: faster, cheaper and simpler ways for a wide range of users (such as a user of electronic device 110-1, who may not be an expert in communications or may not have detailed technical knowledge about access point 116-1 and/or the network that includes access point 116-1) to identify and address errors. These capabilities may allow the disclosed communication techniques to improve the user experience when using access point 116-1 and/or the associated network.

While the preceding discussion illustrates access point 116-1 performing at least some of the operations in the communication techniques, in other embodiments one or more of the operations performed by access point 116-1 in the techniques may be performed by computer system 130, such as a controller of access point 116-1. Alternatively or additionally, in some embodiments one or more of the operations performed by access point 116-1 may be performed by electronic device 110-1. Thus, in general, one or more operations in the techniques may be implemented in a centralized or a distributed manner.

Moreover, while the preceding discussion illustrated the communication techniques with the feedback information including Passpoint® information and/or an SSID associated with access point 116-1, in some embodiments, separately or additionally, when the error occurs access point 116-1 may change the property of the service associated with the network.

Another embodiment provides a neighboring communication network device to the communication network device (e.g., in proximity to or wireless range of the communication network device). Note that the neighboring communication network device or the electronic device may execute a mobile application. During operation, the neighboring communication network device may automatically sense a localized failure (by the communication network device, such as an access point) by: receiving a broadcast or SSID error code from the failed communication network device, establishing in a private communication channel with the failed communication network device (such as a Wi-Fi® connection with a private encrypted SSID, Bluetooth, etc.), collecting failure data (such as troubleshooting information) from the failed communication network device, and uploading error data from the failed communication network device, e.g., to a cloud-based controller or computer system, to assist the failed communication network device in using existing wired backhaul network(s). In some embodiments, the neighboring communication network device may create an associated service ticket for the failed communication network device.

Alternatively or additionally, when there is the localized failure of one communication network device or a general network failure (such as of the backhaul network), the electronic device running the mobile application may sense the problem by: receiving a broadcast or SSID error code from the failed communication network device (e.g., via Wi-Fi®), establishing, in a band of frequencies, a private communication channel (such as a Wi-Fi® connection with a private encrypted SSID, Bluetooth, etc.) to the failed communication network device, collect failure data (troubleshooting information) from the failed communication network device, and upload error data to the cloud-based controller or computer system using an out-of-band cellular connection (e.g., 4G/5G) to assist the failed communication network device (or communication network devices) use an out-of-band communication network (such as a cellular-telephone network). In some embodiments, the electronic device may create an associated service ticket for the failed communication network device.

Figure 2:
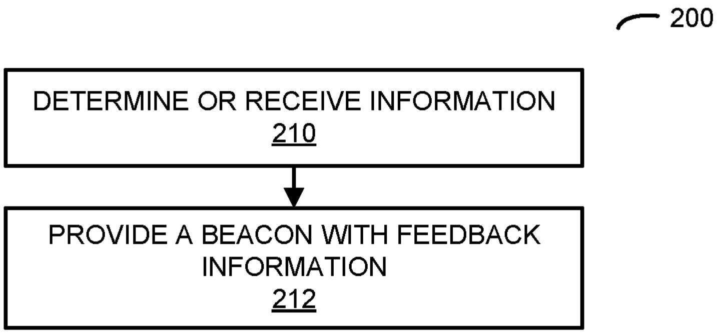
FIG. 2 is a flow diagram illustrating an example of a method for selectively providing dynamic feedback information using a communication network device in FIG. 1 in accordance with an embodiment of the present disclosure.

We now describe embodiments of methods associated with the communication techniques. FIG. 2 presents a flow diagram illustrating an example of a method 200 for selectively providing dynamic feedback information, which may be performed by a communication network device (such as access point 116-1 in FIG. 1). During operation, the communication network device may determine or receive information (operation 210) indicating that an error associated with the communication network device has occurred. Then, the communication network device may provide a beacon with feedback information (operation 212) associated with the error, where the feedback information includes an error message that indicates the error in human-readable form. For example, the feedback information may be readable by a non-technical expert.

For example, the error may occur when an electronic device attempts to associate with the communication network device or when the communication network device attempts to communicate with a service in a network that includes the communication network device.

Note that the communication network device may include: an access point, a switch or a router.

Moreover, the feedback information may be included in or associated with an SSID associated with the communication network device. For example, when the error occurs, the communication network device may dynamically change the SSID of a WLAN provided by the communication network device to include the feedback information.

Alternatively or additionally, the feedback information may be included in a secondary attribute associated with the communication network device. For example, the feedback information may be included in Passpoint® information associated with the WLAN provided by the communication network device. The Passpoint® information may identify the communication network device that is associated with the error.

Furthermore, the feedback information may include an image associated with the error, such as a barcode or a QR code. Additionally, the feedback information may include information about a remedial action to perform to address the error, such as an individual to contact regarding the error.

Note that the feedback information may include information associated with the error, such as real-time information. For example, the information may include a communication performance metric of the network that is impacted by the error.

Moreover, the feedback information may be provided without requiring that a user login to the communication network device or the network.

In some embodiments, when the error occurs, the communication network device may change a property of the service associated with the network.

Figure 3:
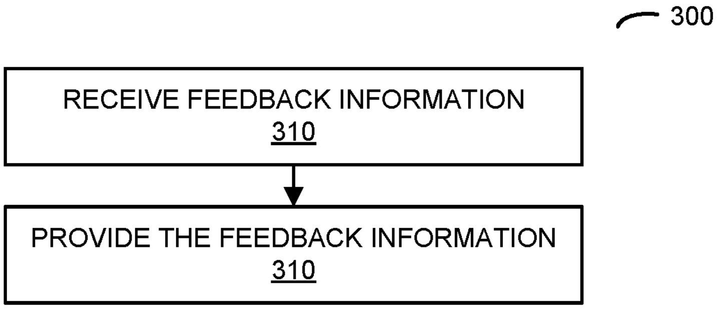
FIG. 3 is a flow diagram illustrating an example of a method for selectively displaying dynamic feedback information using an electronic device in FIG. 1 in accordance with an embodiment of the present disclosure.

FIG. 3 presents a flow diagram illustrating an example of a method 300 for displaying feedback information, which may be performed by an electronic device (such as electronic device 110-1 in FIG. 1). During operation, the electronic device may receive feedback information (operation 310) associated with a communication network device, where the feedback information indicates that an error associated with the communication network device has occurred, and the feedback information includes an error message that indicates the error in human-readable form. For example, the electronic device may receive a beacon from the communication network device that includes the feedback information. Alternatively, the electronic device may provide a probe request addressed to the communication network device, and may receive the feedback information in a probe response provided by the communication network device addressed to the electronic device.

Then, the electronic device may provide the feedback information (operation 312) to a user of the electronic device. For example, the electronic device may display the feedback information in a user interface. Notably, the feedback information may be included in an SSID of a WLAN provided by the communication network device or may include a secondary attribute associated with the communication network device, such as Passpoint® information associated with the WLAN provided by the communication network device.

In some embodiments of methods 200 (FIG. 2) and 300, there may be additional or fewer operations. Furthermore, the order of the operations may be changed, and/or two or more operations may be combined into a single operation.

Figure 4:
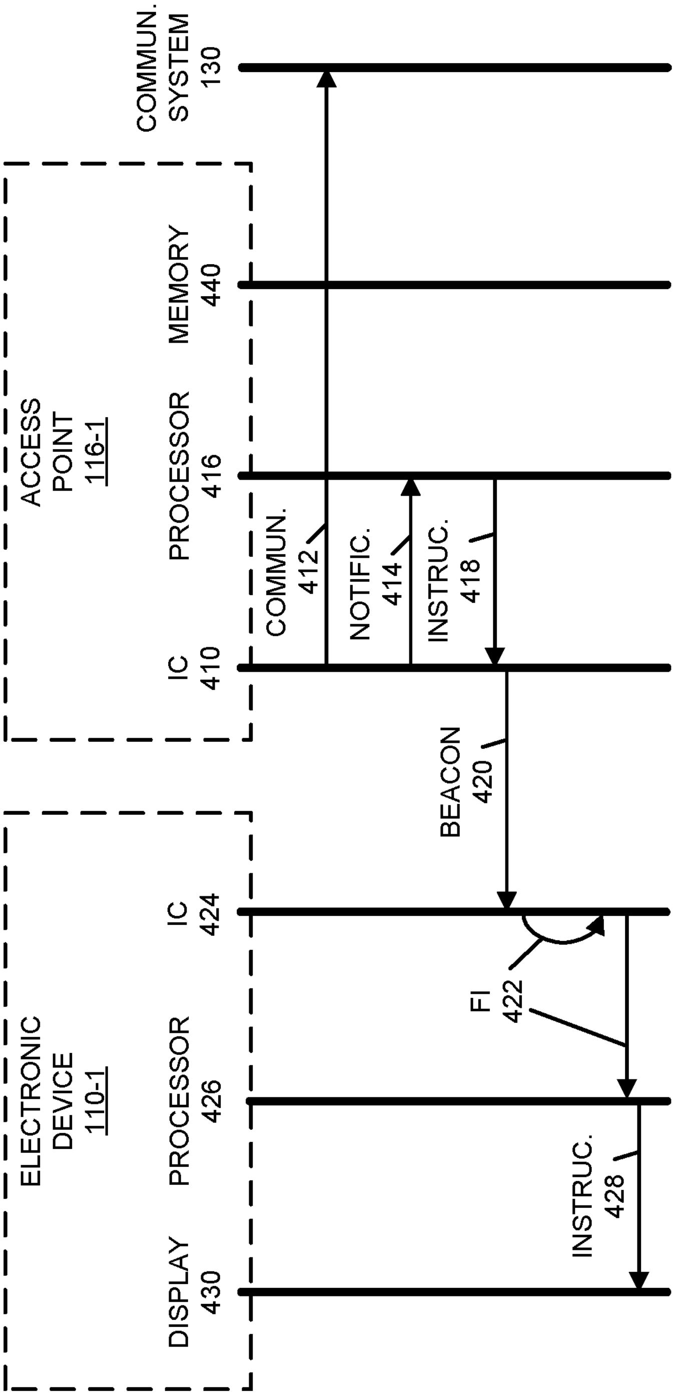
FIG. 4 is a drawing illustrating an example of communication between an electronic device and a communication network device in FIG. 1 in accordance with an embodiment of the present disclosure.

Embodiments of the communication techniques are further illustrated in FIG. 4, which presents a drawing illustrating an example of communication among electronic device 110-1, access point 116-1 and computer system 130. Notably, interface circuit 410 in access point 116-1 may attempt to communicate 412 with computer system 130 (which may provide a service in network that includes access point 116-1).

When communication 412 is unsuccessful (e.g., interface circuit 410 may not receive an acknowledgment from computer system 130 within a time interval), interface circuit 410 may provide a notification 414 of an error to a processor 416 in access point 116-1. In response, processor 416 may instruct 418 interface circuit 410 to modify beacons (such as beacon 420) that are routinely transmitted or provided by interface circuit 410. Notably, beacon 420 may include feedback information (FI) 422 that includes an error message that indicates the error in human-readable form and/or an image that indicates the error.

After receiving beacon 420 (such as during a scan), interface circuit 424 in electronic device 110-1 may provide feedback information 422 to processor 426 in electronic device 110-1. Then, processor 426 may instruct 428 display 430 in electronic device 110-1 to display feedback information 422, e.g., in a user interface. For example, feedback information 422 may be included in an SSID of a WLAN provided by access point 116-1 and/or Passpoint® information associated with the WLAN provided by access point 116-1.

While FIG. 4 illustrates communication between components using unidirectional or bidirectional communication with lines having single arrows or double arrows, in general the communication in a given operation in this figure may involve unidirectional or bidirectional communication. Moreover, while FIG. 4 illustrates operations being performed sequentially or at different times, in other embodiments at least some of these operations may, at least in part, be performed concurrently or in parallel.

We now further describe the disclosed communication techniques. Notably, the communication techniques may simplify troubleshooting of access points (and, more generally, communication network devices) when they have trouble or experience errors, such as when establishing normal operational connections with a local or a remote (cloud-based) controller. Typical errors may include failing a firmware diagnostics test, being unable to obtain an IP address, not being able to reach controller, not being able to reach a Domain Name System (DNS) that translates a human-readable domain name into a machine-readable domain name, etc. Existing access points use flashing LEDs to indicate errors. However, the flashing pattern is usually undecipherable, especially for a non-technical individual or user. Indeed, even if the non-technical user could understand the flashing pattern, the flashing pattern is often not even visible to a typical user (such as for a ceiling-mounted access point). Consequently, a user often needs to somehow locally log into the access point via a cable connection or the access point may start to broadcast an SSID specifically for enabling the user to wirelessly connect, e.g., a personal computer, to the access point in order to troubleshoot the error. However, these approaches are usually opaque and require an experience technical person to navigate through this information in order to get a basic understanding of the error.

In the disclosed communication techniques, the access point increases the immediacy and ease of troubleshooting by informing the user directly about the error. For example, the access point may indicate exactly what the problem or error is that it's experiencing in (more or less) plain English that anyone (including a non-technical user) can understand. Notably, the access point may accomplish this by provisioning another SSID (and, more generally, one or more SSIDs) that would be visible to any client enabling the user(s) to immediately understand the nature of the problem. In some embodiments, the access point may use out-of-band communication (such as in a different band of frequencies than is used by an IEEE 802.11 communication protocol) to provide error-code information to a remotely located support service or personnel.

In some embodiments, assume the access point is booting up and cannot obtain an IP address from a DHCP server. Then, the access point may provide an error message via a new SSID, such as: "ERROR-DHCP server not reachable." In this way, the user would no longer have difficulty in understanding when the access point is not up and running and/or would no longer need to connect a cable and login to a local Web interface in order to understand what the problem or error is. Instead, just by looking at a user interface with a list of available SSIDs on an electronic device that receives a beacon or a probe response with the new SSID, the user would understand the nature of the error.

As noted previously, instead of or in addition to changing the SSID, in some embodiments the access point may change Passpoint® information associated with the WLAN provided by the access point.

FIG. 5 presents a drawing illustrating an example of a user interface 500 in an electronic device (such as electronic device 110-1 in FIG. 1). This user interface may include or may display the feedback information, along with a list of available WLANs or networks. For example, a connection manager in the electronic device may use user interface 500 to display an SSID 510 of a WLAN provided by the access point and/or Passpoint® information 512 of the WLAN, which may include the feedback information. In some embodiments, Passpoint® information 512 may include an information element with the feedback information. Note that the feedback information may uniquely identify the access point.

In some embodiments, user interface 500 may include fewer or additional features, a location(s) of one or more feature may be changed, two or more features may be combined into a single feature and/or a single feature may be subdivided into two or more features.

Moreover, in some embodiments, when the electronic device (such as electronic device 110-1 in FIG. 1) does not support secondary attributes associated with a WLAN, the access point may selectively modify the SSID of the WLAN to provide the feedback information. Alternatively, when this occurs, the user of the electronic device may go to a web page have a predefined location (such as a uniform resource locator or URL, or a uniform resource identifier or URI) where the user can obtain instructions on how to address the error or problem. Thus, when a general (including a non-technical) user is unable to associate with the access point, the using the communication techniques, the user may quickly understand and take appropriate remedial action to address the error or the problem. More generally, the feedback information may simplify the reporting and addressing of the error or the problem.

Alternatively or additionally, in some embodiments, the communication techniques may include the access point may broadcast multiple SSIDs to convey additional information about the error.

Furthermore, in some embodiments, an electronic device (such as a cellular telephone) that connects (e.g., automatically) to the access point (and, more generally, the communication network device) via a cellular-telephone network may obtain (e.g., automatically) a log of the access point with the feedback information about the error. Then, the electronic device may automatically file a troubleshooting ticket, so that technical support can address or fix the error.

Additionally, in some embodiments, switching infrastructure (such as a switch or a router) may use the communication techniques. In some embodiments, the switch or the router may use the feedback information to troubleshoot the error (such as an error associated with the switch or the router) without security issues. For example, an access point associated with or plugged into a switch may provide a virtual interface for troubleshooting the error or the problem.

We now describe embodiments of an electronic device, which may perform at least some of the operations in the disclosed communication techniques. FIG. 6 presents a block diagram illustrating an example of an electronic device 600 in accordance with some embodiments, such as one of: base station 108, one of electronic devices 110, one of access points 116, one of radio nodes 118, the other communication network device 128, computer system 130 or one of computers 132. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, one or more graphics process units (GPUs) and/or one or more digital signal processors (DSPs). In some embodiments, one or more components in processing subsystem 610 is referred to as a 'computation device.'

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements) and/or input/output (I/O) port 630. (While FIG. 6 includes one or more antennas 620, in some embodiments electronic device 600 includes one or more nodes, such as antenna nodes 608, e.g., a network node that can be coupled or connected to a network or link, or an antenna node or a pad that can be coupled to the one or more antennas 620. Thus, electronic device 600 may or may not include the one or more antennas 620.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a radio, a transponder, a transceiver, a computer, a computer system, a desktop computer, a laptop computer, a subnotebook/netbook, a tablet computer, a smartphone, a cellular telephone, a smartwatch, a consumer-electronic device, a portable computing device, a display, a heads-up display, a headset, an augmented-reality or a virtual-reality headset, smart glasses, communication equipment, a communication network device, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, display subsystems and/or another subsystem (such as a sensor subsystem with one or more sensors). Additionally, one or more of the subsystems may not be present in electronic device 600. Moreover, in some embodiments, electronic device 600 may include one or more additional subsystems that are not shown in FIG. 6, such as a user-interface subsystem 632. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 (or, more generally, of electronic device 600). The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used particular communication protocols as an illustrative example, in other embodiments a wide variety of communication protocols and, more generally, wired and/or wireless communication techniques may be used. Thus, the disclosed techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the disclosed techniques may be implemented using program instructions 622, operating system 624 (such as a driver for interface circuit 618) or in firmware in interface circuit 618. Alternatively or additionally, at least some of the operations in the disclosed techniques may be implemented in a physical layer, such as hardware in interface circuit 618.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A communication network device, comprising:

an interface circuit;

a processor; and memory that stores program instructions, wherein, when executed by the processor, causes the communication network device to perform operations comprising:

broadcasting, by the communication network device, a first beacon comprising a first selective service set identifier (SSID);

determining, by the communication network device, that an error within the communication network device has occurred;

generating, by the communication network device, a second SSID with an error message that indicates the error in human-readable form comprising plain English; and broadcasting, by the communication network device, a second beacon comprising the second SSID.

2. The communication network device of claim 1, wherein the error occurs when an electronic device attempts to associate with the communication network device or when the communication network device attempts to communicate with a service in a network that includes the communication network device.

3. The communication network device of claim 1, wherein the communication network device comprises: an access point, a switch or a router.

4. The communication network device of claim 1, wherein the generating the second SSID comprises dynamically changing the first SSID.

5. The communication network device of claim 1, wherein the error message is included in a secondary attribute associated with the communication network device.

6. The communication network device of claim 5, wherein the error message is included in Passpoint® information associated with a wireless local area network (WLAN) provided by the communication network device.

7. The communication network device of claim 6, wherein the Passpoint® information identifies the communication network device that is associated with the error.

8. The communication network device of claim 1, wherein the second beacon comprises an image associated with the error.

9. The communication network device of claim 8, wherein image comprises a barcode or a quick response (QR) code.

10. The communication network device of claim 1, wherein the second beacon comprises information about a remedial action to perform to address the error.

11. The communication network device of claim 1, wherein the second beacon comprises a communication performance metric of a network that includes the communication network device and that is impacted by the error.

12. The communication network device of claim 1, wherein the error message is provided without requiring that a user login to the communication network device or a network that includes the communication network device.

13. The communication network device of claim 1, wherein, when the error occurs, the operations comprise changing a property of a service associated with a network that includes the communication network device.

14. A non-transitory computer-readable storage medium for use in conjunction with a communication network device, the computer-readable storage medium storing program instructions, wherein, when executed by the communication network device, cause the communication network device to perform one or more operations comprising:

broadcasting, by the communication network device, a first beacon comprising a first selective service set identifier (SSID);

determining, by the communication network device, that an error within the communication network device has occurred;

generating, by the communication network device, a second SSID with an error message that indicates the error in human-readable form comprising plain English; and broadcasting, by the communication network device, a second beacon comprising the second SSID.

15. The non-transitory computer-readable storage medium of claim 14, wherein the error message is included in Passpoint® information associated with a wireless local area network (WLAN) provided by the communication network device.

16. The non-transitory computer-readable storage medium of claim 14, wherein the generating the second SSID comprises dynamically changing the first SSID.

17. A method for selectively providing a second beacon comprising a second selective service set identifier (SSID), comprising:

by a communication network device:

broadcasting a first beacon comprising a first SSID;

determining that an error within the communication network device has occurred;

generating the second SSID with an error message that indicates the error in human-readable form comprising plain English; and broadcasting the second beacon comprising the second SSID.

18. The method of claim 17, wherein the error message is included in Passpoint information associated with a wireless local area network (WLAN) provided by the communication network device.

19. The method of claim 17, wherein the generating the second SSID comprises dynamically changing the first SSID.

20. The method of claim 17, wherein the communication network device comprises: an access point, a switch or a router.

* * * * *